United States Patent
Zhang et al.

(10) Patent No.: US 9,402,279 B1
(45) Date of Patent: Jul. 26, 2016

(54) MULTI-LEVEL ARBITRATION FOR WIRELESS DEVICE HAVING MULTIPLE RADIO RESOURCES

(71) Applicant: Marvell International Ltd., Hamilton (BM)

(72) Inventors: Hao Zhang, San Jose, CA (US); Nelson Xu, Cupertino, CA (US); Yiqing Shen, San Jose, CA (US); Ken Yeung, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 176 days.

(21) Appl. No.: 13/897,015

(22) Filed: May 17, 2013

Related U.S. Application Data

(60) Provisional application No. 61/648,176, filed on May 17, 2012.

(51) Int. Cl.
*H04B 1/00* (2006.01)
*H04W 88/06* (2009.01)
*H04B 7/00* (2006.01)

(52) U.S. Cl.
CPC ...... *H04W 88/06* (2013.01); *H04B 7/00* (2013.01)

(58) Field of Classification Search
CPC ......... H04L 5/0044; H04B 7/00; H04M 1/00; H04Q 7/20
USPC .......................... 455/73, 82, 78, 452.1, 435.2
See application file for complete search history.

(56) References Cited

U.S. PATENT DOCUMENTS

| | | | |
|---|---|---|---|
| 8,086,213 B1 * | 12/2011 | Wong ................. | H04W 52/028 455/334 |
| 8,165,544 B2 | 4/2012 | Tran et al. | |
| 8,244,944 B1 * | 8/2012 | Wong .................... | H04W 48/02 370/329 |
| 8,769,176 B1 * | 7/2014 | Wong .................... | H04W 48/02 370/329 |
| 2004/0029619 A1 * | 2/2004 | Liang ..................... | H01Q 21/28 455/562.1 |
| 2008/0051085 A1 * | 2/2008 | Ganton ................. | H04W 88/06 455/435.2 |
| 2008/0287158 A1 * | 11/2008 | Rayzman ............... | H04W 72/06 455/552.1 |

(Continued)

OTHER PUBLICATIONS

Golmie, N., N. Chevrollier, and O. Rebala. "Bluetooth and WLAN Coexistence: Challenges and Solutions." Networking for Pervasive Computing 500 (2005), pp. 116-123.

*Primary Examiner* — Md Talukder

(57) ABSTRACT

Systems and techniques relating to wireless communications are described. A described technique includes performing, at a wireless communication device, an arbitration among multiple different wireless radio technologies, which collectively use two or more radio resources of the wireless communication device, to produce an arbitration result; and operating the two or more radio resources in accordance with the arbitration result. Performing the arbitration can include performing a first level arbitration between a request associated with a first technology of the multiple different wireless radio technologies and a request associated with a second technology of the multiple different wireless radio technologies to produce a first level result; and performing a second level arbitration to produce a second level result when indicated by the first level result. The arbitration result can be based on the first level result and the second level result, if any.

16 Claims, 6 Drawing Sheets

(56) References Cited

U.S. PATENT DOCUMENTS

| | | | | |
|---|---|---|---|---|
| 2009/0239471 A1* | 9/2009 | Tran | H04B 1/006 | 455/41.2 |
| 2010/0304770 A1* | 12/2010 | Wietfeldt | H04W 72/1215 | 455/509 |
| 2011/0249760 A1* | 10/2011 | Chrisikos | H01Q 1/243 | 375/259 |
| 2011/0250926 A1* | 10/2011 | Wietfeldt | H01Q 1/243 | 455/525 |
| 2012/0030357 A1* | 2/2012 | Linsky | H04W 72/1215 | 709/226 |
| 2013/0012141 A1* | 1/2013 | Harnishfeger | H03J 3/04 | 455/75 |
| 2013/0196643 A1* | 8/2013 | Medapalli | H04W 72/044 | 455/418 |
| 2013/0315169 A1* | 11/2013 | Porat | H04L 5/0044 | 370/329 |
| 2014/0233493 A1* | 8/2014 | Siomina | H04L 5/0044 | 370/329 |

* cited by examiner

MULTI-LEVEL ARBITRATION FOR WIRELESS DEVICE HAVING MULTIPLE RADIO RESOURCES

CROSS REFERENCE TO RELATED APPLICATION

This disclosure claims the benefit of the priority of U.S. Provisional Application Ser. No. 61/648,176, filed May 17, 2012, and entitled "BCA Coex scheme among BT/WLAN/NFC/LTE", which is incorporated herein by reference in its entirety.

BACKGROUND

This disclosure relates to arbitration techniques for wireless communications.

Wireless communication systems and associated devices can use one or more wireless radio technologies, such as Code Division Multiple Access (CDMA) or orthogonal frequency division multiplexing (OFDM), to communicate. Further, such devices can include standards-based wireless radio technologies such as Long-Term Evolution (LTE), High Speed Packet Access (HSPA), Wideband Code Division Multiple Access (WCDMA), CDMA2000, or Global System for Mobile Communications (GSM). Moreover, such devices can include additional standards-based wireless technologies such as Near Field Communication (NFC) technology, Bluetooth technology, and wireless local area network (WLAN) technology. Examples of WLAN technology include those based on the IEEE 802.11 family of standards. Various examples of wireless communication devices include mobile phones, smart phones, wireless routers, wireless hubs, base stations, and access points. Moreover, additional examples of devices include wireless sensors, wireless actuators, and wireless control panels. In some cases, wireless communication electronics are integrated with data processing equipment such as laptops, personal digital assistants, and computers.

SUMMARY

The present disclosure includes systems and techniques related to multi-level arbitration for wireless communications. According to an aspect of the described systems and techniques, a method for wireless communications includes performing, at a wireless communication device, an arbitration among multiple different wireless radio technologies, which collectively use two or more radio resources of the wireless communication device, to produce an arbitration result; and operating the two or more radio resources in accordance with the arbitration result. Performing the arbitration can include performing a first level arbitration between a request associated with a first technology of the multiple different wireless radio technologies and a request associated with a second technology of the multiple different wireless radio technologies to produce a first level result; and performing a second level arbitration to produce a second level result when indicated by the first level result. The arbitration result can be based on the first level result and the second level result, if any. Other forms of this aspect include corresponding systems, apparatuses, and computer software encoded on a non-transitory computer readable storage medium such as a non-volatile solid-state memory or a disk drive.

These and other implementations can include one or more of the following features. Performing the second level arbitration can include performing an arbitration between (i) a request associated with a third technology of the multiple different wireless technologies and (ii) a request associated with a fourth technology of the multiple different wireless technologies; and performing an arbitration between (i) the request associated with the second technology and (ii) the request associated with the fourth technology. Performing the arbitration can include determining whether to perform a third level arbitration based on the second level result; and selectively performing the third level arbitration between (i) the request associated with the second technology and (ii) the request associated with the third technology to produce a third level result. In some implementations, the first technology, the second technology, and the third technology are respectively a Near Field Communication (NFC) technology, a wireless local area network (WLAN) technology, and a Bluetooth technology. In some implementations, the fourth technology is based on a version of Long-Term Evolution (LTE), High Speed Packet Access (HSPA), Wideband Code Division Multiple Access (WCDMA), CDMA2000, or Global System for Mobile Communications (GSM). Performing the first level arbitration can include performing at least one arbitration to prevent or minimize an increase in temperature of the wireless communication device, a collective current draw of the two or more radio resources, or both. Performing the second level arbitration can include performing at least one arbitration to prevent or minimize potential inter-technology frequency interference among a subset of the multiple different wireless radio technologies.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

A wireless communication device can include two or more radio resources configured to be collectively used by multiple different wireless radio technologies, where the multiple different wireless technologies include a first technology, a second technology, a third technology, and a fourth technology; and an arbitrator configured to perform a multi-level arbitration among the first technology, the second technology, the third technology, and the fourth technology of the multiple different wireless radio technologies to produce an arbitration result, where the two or more radio resources are operated in accordance with the arbitration result.

These and other implementations can include one or more of the following features. The multi-level arbitration can include performing a first level arbitration between (i) a request associated with the first technology and (ii) a request associated with the second technology to produce a first level result; determining whether to perform a second level arbitration based on the first level result; and selectively performing the second level arbitration to produce a second level result. The second level arbitration can include performing an arbitration between (i) a request associated with the fourth technology and (ii) the request associated with the second technology; and performing an arbitration between (i) the request associated with the fourth technology and (ii) a request associated with the third technology. The multi-level arbitration can include determining whether to perform a third level arbitration based on the second level result; and selectively performing the third level arbitration between (i) the request associated with the second technology and (ii) the request associated with the third technology to produce a third level result. The first technology, the second technology, and the third technology are respectively a NFC technology, a WLAN technology, and a Bluetooth technology. The multi-level arbitration can include performing a first level arbitration between (i) a request associated with the NFC technology and (ii) a request associated with the WLAN technology; selectively performing a second level arbitration among (i) a request associated with the fourth technology, (ii) the request associated with the WLAN technology, and (iii) a request associated with the Bluetooth technology, and selectively performing a third level arbitration between (i) the request associated with the WLAN technology and (ii) the request associated with the Bluetooth technology. The second level arbitration can include performing an arbitration between (i) a request associated with the fourth technology and (ii) the request associated with the WLAN technology; and performing an arbitration between (i) the request associated with the fourth technology and (ii) a request associated with the Bluetooth technology. In some implementations, the fourth technology is based on a version of LTE, HSPA, WCDMA, CDMA2000, or GSM. The multi-level arbitration can include performing at least one arbitration to prevent or minimize an increase in temperature of the device, a collective current draw of the two or more radio resources, or both. The multi-level arbitration can include performing at least one arbitration to prevent or minimize potential inter-technology frequency interference among a subset of the multiple different wireless radio technologies.

Potential advantages of multi-level arbitration for a device's radio resources can include efficiently resolving conflicts among transmission requests associated with different wireless radio technologies. A multi-level arbitration for radio resources can be designed to facilitate coexistence among such technologies. Efficiently resolving conflicts can include reduced arbitration overhead, reduced arbitration latency, or both. A wireless communication device can use a multi-level arbitration process to reduce frequency interference between competing wireless radio technologies, reduce current draw, reduce device temperature, or a combination thereof.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
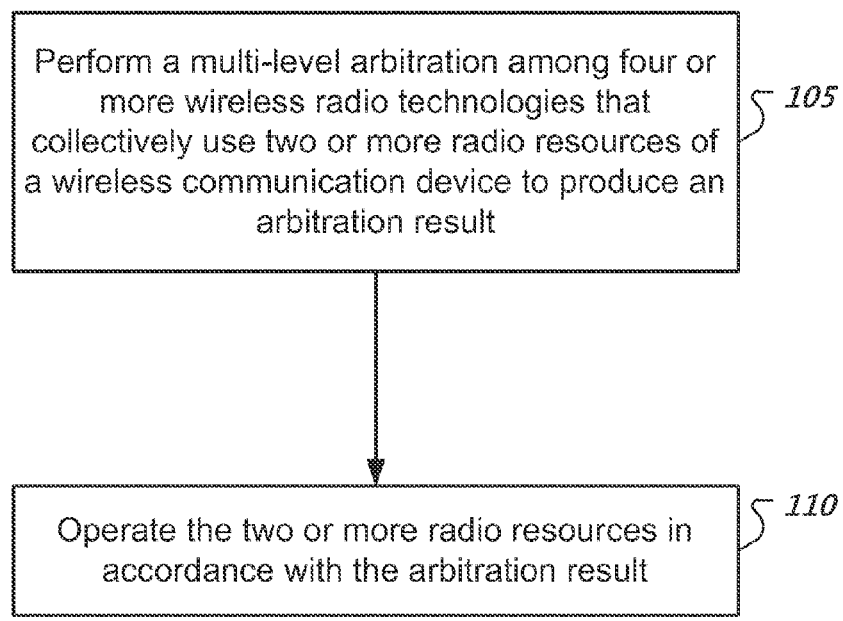
FIG. 1 shows a flowchart for an example of a process including a multi-level arbitration for radio resources requested by different wireless radio technologies used by a wireless communication device.

FIG. 1 shows a flowchart for an example of a process including a multi-level arbitration for radio resources requested by different wireless radio technologies used by a wireless communication device. At 105, the process performs a multi-level arbitration among four or more wireless radio technologies that collectively use two or more radio resources of a wireless communication device to produce an arbitration result. An arbitration result can identify winners of the two or more radio resources of the wireless communication device. The arbitration result can be based on a collection of intermediate results, such as a first level result, second level result, and a third level result. A multi-level arbitration may be required to resolve conflicts such as hardware conflicts, frequency usage conflicts, or both. Moreover, even if a device has multiple radio resources that can collectively provide simultaneous transmissions in accordance with different wireless radio technologies, it may be advantageous to limit simultaneous usage when such usage would increase a device's temperature or current draw beyond a predetermined maximum threshold value. In some implementations, a multi-level arbitration, at 105, can include a hierarchy of different arbitrations that arbitrate between different pairs of the wireless radio technologies, where each level of the hierarchy produces a level result. A result of one level of the hierarchy can affect other levels of the hierarchy. For example, if a conflict between two radio technologies is not resolved at a first level of a hierarchy, then additional levels of the hierarchy can be used. Additional levels of the hierarchy can be required if other conflicts exist.

At 110, the process operates the two or more radio resources in accordance with the arbitration result. In some cases, operating the two or more radio resources includes operating the two or more radio resources to simultaneously transmit data in different frequency bands that do not cause inter-technology frequency interference. In some cases, operating the two or more radio resources includes operating one resource to transmit while operating another resource at idle.

Figure 2:
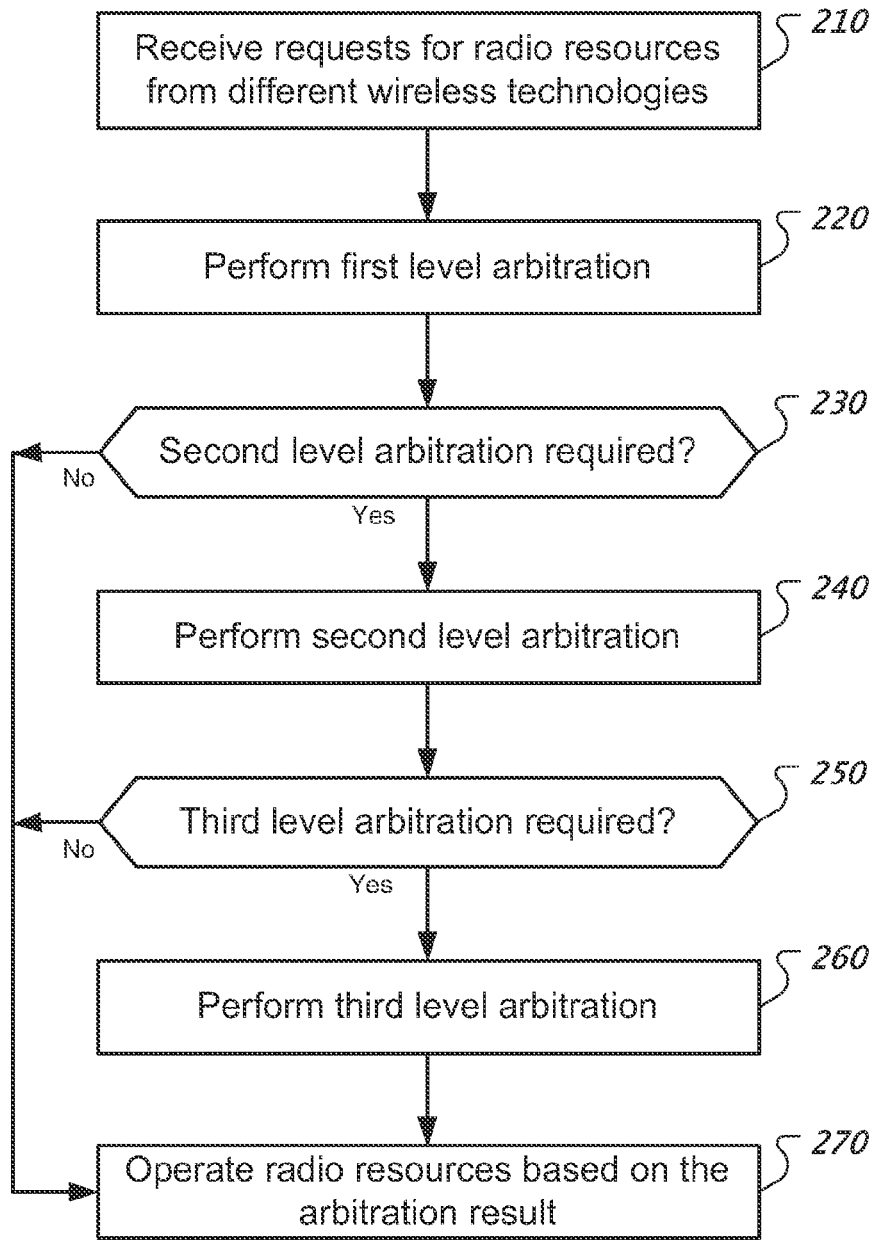
FIG. 2 shows a flowchart for another example of a process including a multi-level arbitration for radio resources.

FIG. 2 shows a flowchart for another example of a process including a multi-level arbitration for radio resources. At 210, the process receives requests for radio resources from different wireless technologies. Receiving requests for radio resources can include receiving requests generated by different wireless technologies residing on a wireless device within a predetermined arbitration window period. For example, a request to transmit on a WLAN interface, a request to transmit on a Bluetooth interface, a request to transmit on a wireless cellular technology, and a request to use a NFC interface can be received within an arbitration window period. Such requests can be generated by respective controllers or communication processes on the wireless device. In some cases, a request, for example, can be triggered in response to a user-generated event such as a user selecting to download a video. In some cases, a request can be triggered in response to a device-generated event such as when an audio packet is ready to be transmitted to a Bluetooth earpiece or when the device has to send an acknowledgement to a received data packet. Other types of requests are possible.

At 220, the process performs first level arbitration. In some implementations, performing the first level arbitration can include identifying a subset of wireless technologies represented by the requests received at 210. Identifying the subset can include selecting technologies that would potentially cause current draw or thermal issues if allowed to simultaneously transmit. Identifying the subset can include selecting technologies that would potentially cause mutual frequency interference if allowed to simultaneously transmit. Further, performing the first level arbitration can include performing an arbitration between a request associated with a first wireless technology of the subset and a request associated with a second technology of the subset to produce a first level result. A level result can include an indication of a winner at that level. An arbitration can include using a communication priority of a request, and selecting a request with a higher communication priority. For example, voice traffic may have a higher priority than data traffic. Further, a request for transmitting a data packet acknowledgement may have a higher priority than transmitting a new data packet in order to avoid unnecessary data packet retransmissions caused by unacknowledged data packets.

At 230, the process determines whether a second level arbitration is required. The determining can include identifying one or more conflicts that exist among the winner of the first level arbitration and any remaining wireless technologies associated with the received requests. In some cases, the determining can further include identifying conflicts within the remaining wireless technologies associated with the received requests. In some implementations, the determining can include accessing a conflict look-up table that is indexed by indices representing different wireless technologies. If the second level arbitration is not required, the process continues at 270. If required, the process, at 240, performs the second level arbitration.

At 250, the process determines whether a third level arbitration is required. If the third level arbitration is not required, the process continues at 270. If required, the process, at 260, performs the third level arbitration. In some implementations, a second level arbitration can include two or more arbitrations, and can respectively produce two or more second level winners. If the two or more second level winners create a conflict, then a third level arbitration can be performed to select a winner.

At 270, the process operates the radio resources based on the arbitration result. An arbitration result can include the overall winners of the multi-level arbitration. A number of overall winners can be equal to the number of radio resources in play during the multi-level arbitration, with each winner being assigned to a radio resource. In some cases, the number of overall winners can be one or any other positive number less than the number of radio resources. In some implementations, a losing request can be given higher priority in subsequent multi-level arbitrations.

Figure 3:
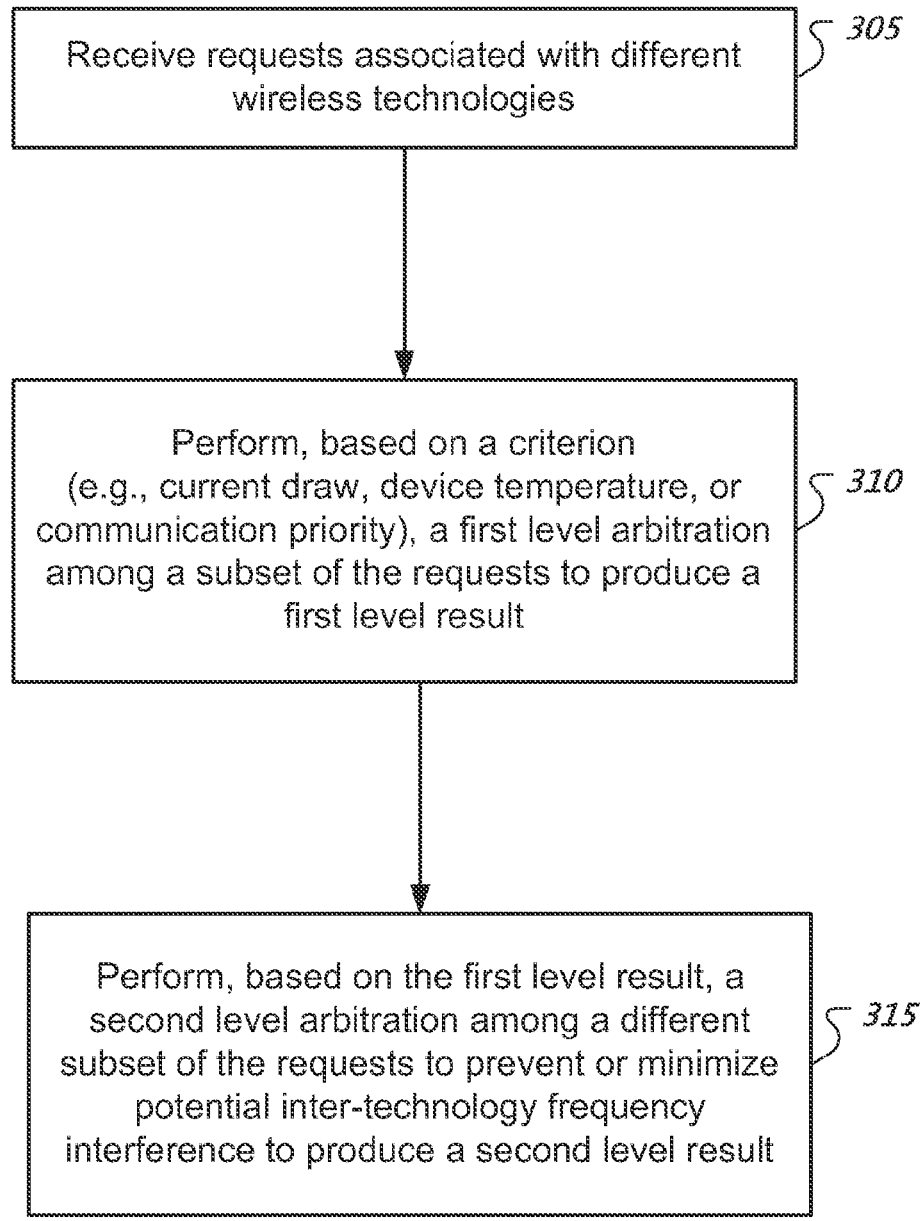
FIG. 3 shows a flowchart for another example of a process including a multi-level arbitration for radio resources.

FIG. 3 shows a flowchart for another example of a process including a multi-level arbitration for radio resources. At 305, the process receives requests associated with different wireless technologies. At 310, the process performs, based on a criterion, a first level arbitration among a subset of the requests to produce a first level result. Various examples of a criterion include a maximum current draw criterion, device temperature criterion, or communication priority criterion. Other types of criterions are possible. At 315, the process performs, based on the first level result, a second level arbitration among a different subset of the requests to prevent or minimize potential inter-technology frequency interference to produce a second level result. Inter-technology frequency interference can be caused by, for example, simultaneous operations in a frequency band used by one wireless technology and a frequency band used by another wireless technology, where these frequency bands are adjacent.

Figure 4:
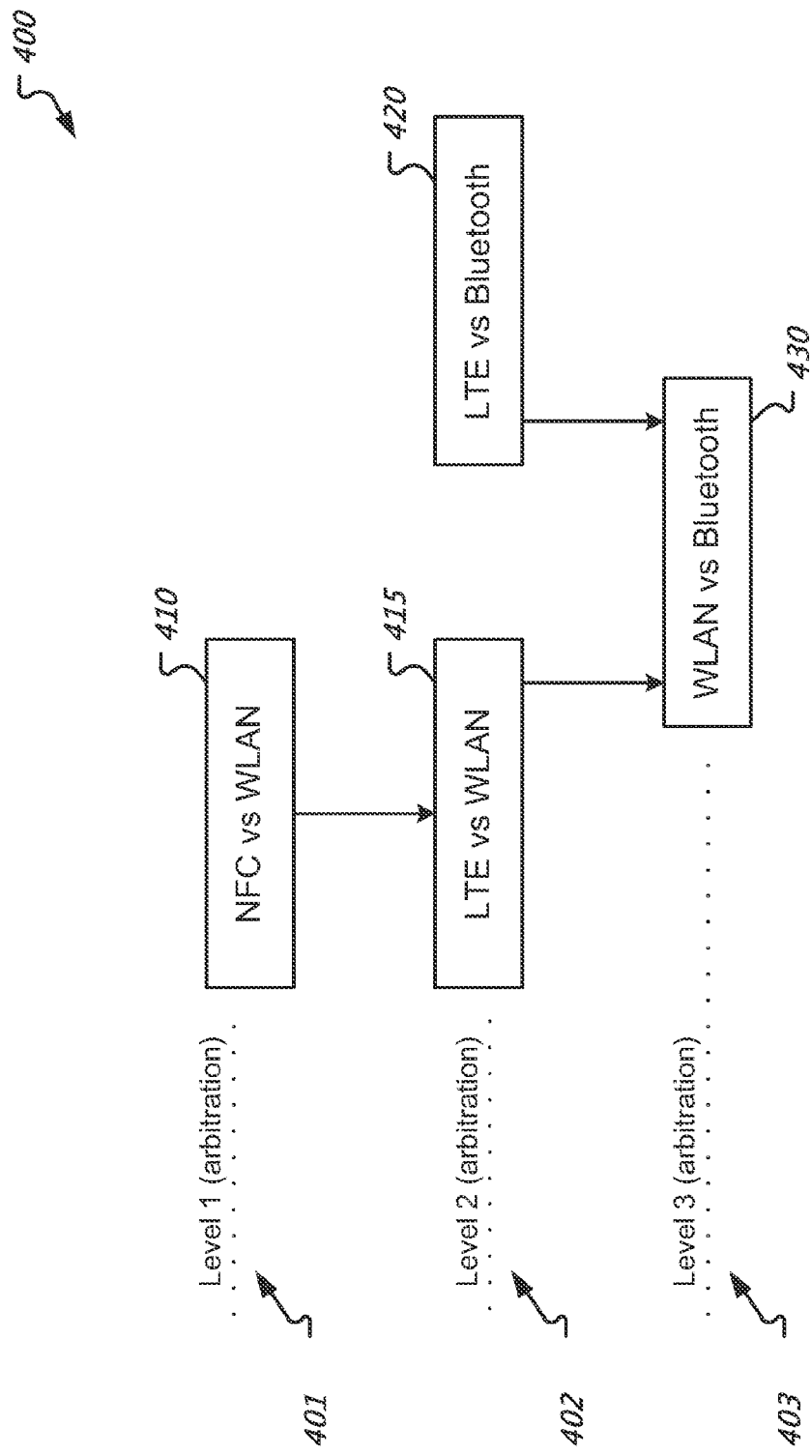
FIG. 4 shows a diagram for a multi-level arbitration among wireless technologies including NFC, WLAN, Bluetooth, and LTE.

FIG. 4 shows a diagram for a multi-level arbitration among wireless technologies including NFC, WLAN, Bluetooth, and LTE. A wireless device, in this example, includes two or more radio resources that collectively provide NFC, WLAN, Bluetooth, and LTE communication capabilities. The wireless device is configured to perform a multi-level arbitration technique 400 that includes a first level arbitration 401, a second level arbitration 402, and a third level arbitration 403. The first level arbitration 401 includes a determination 410 between NFC and WLAN. The second level arbitration 402 includes a determination 415 between LTE and WLAN and a determination 420 between LTE and Bluetooth. The third level arbitration 403 includes a determination 430 between WLAN and Bluetooth.

In the second level 402, LTE is separately arbitrated with WLAN and with Bluetooth based on there being a potential for frequency interference. A wireless device, for example, may be using a frequency for LTE that is adjacent to a frequency used by Bluetooth or WLAN. Frequency adjacency, among other things, may cause frequency interference. In some implementations, a wireless device can be configured to give the highest transmission priority to LTE traffic. For example, a wireless device may allow a LTE traffic transmission to go ahead of a Bluetooth transmission.

If WLAN wins in both the first level 401 and the second level 402, and Bluetooth wins over LTE in the second level 402, the third level arbitration 403 can be conducted between WLAN and Bluetooth. Based on the overall structure of the multi-level arbitration technique 400, it can be efficient to have NFC and WLAN arbitrated in the first level 401, because if WLAN loses, the determination 415 between LTE and WLAN is not required and the determination 430 between WLAN and Bluetooth is also not required.

Figure 5:
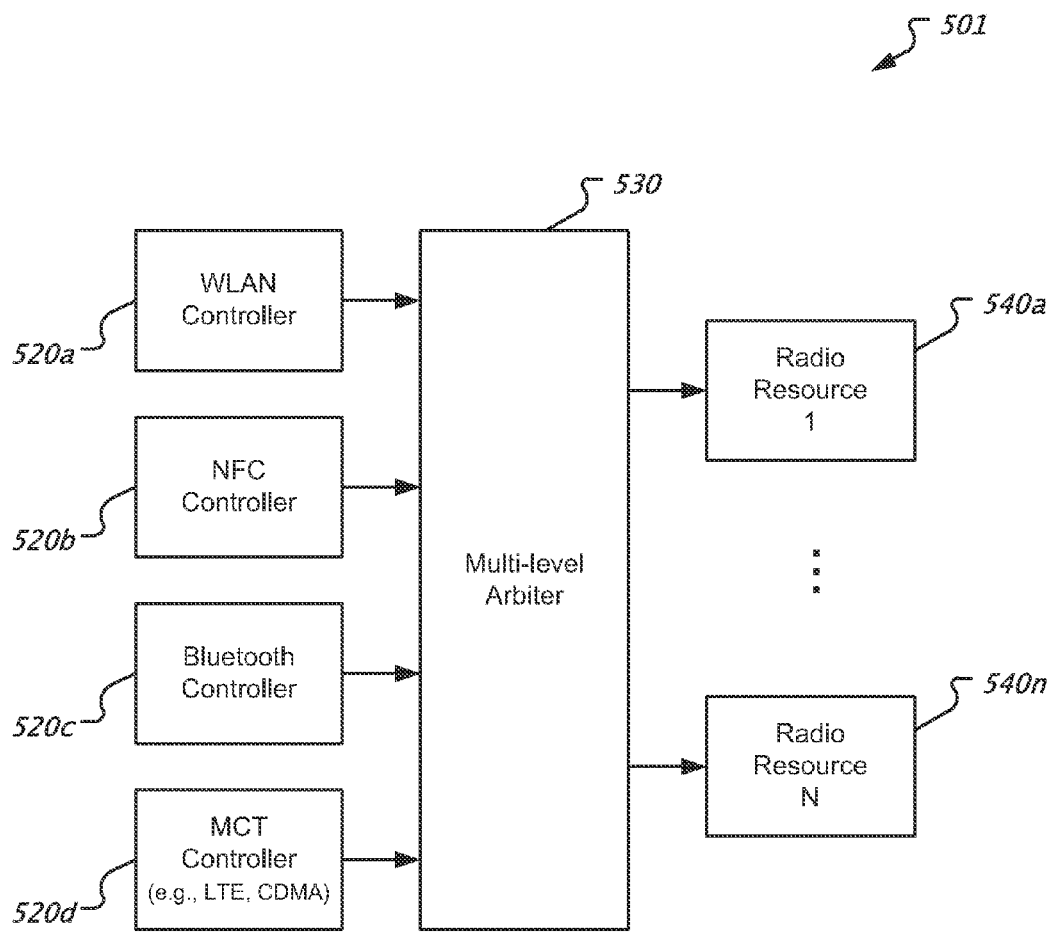
FIG. 5 shows a diagram for an example of a multi-level arbitration architecture of a wireless communication device.

FIG. 5 shows a diagram for an example of a multi-level arbitration architecture of a wireless communication device 501. The device 501 includes controllers 520a-d for wireless radio technologies, multi-level arbiter 530, and radio resources 540a-n. The radio resources 540a-n can include circuitry to transmit and receive data. The controllers include a WLAN controller 520a, NFC controller 520b, Bluetooth controller 520c, and mobile communication technology (MCT) controller 520d. The MCT controller 520d can be a controller for a wireless technology such as LTE, HSPA, WCDMA, CDMA2000, or GSM. Other types of wireless technologies for the MCT controller 520d are possible.

The controllers 520a-d can include a media access control (MAC) layer. Each controller 520a-d can be configured to provide a single request to the multi-level arbiter 530 within an arbitration window period. In some implementations, based on a controller 520a-d having multiple requests, the controller 520a-d is configured to select only one of the multiple requests to provide to the multi-level arbiter 530 within an arbitration window period. The multi-level arbiter 530 can be programmed with a hardware configuration of the device 501. A hardware configuration can include the number of radio resources 540a-n, conflict information among the wireless radio technologies, current frequency assignments, or a combination thereof. Frequency assignments can change during operation of a wireless device, and conflict information may change as a result. Based on performing a multi-level arbitration, the multi-level arbiter 530 can pass one or more winning requests to one or more of the radio resources 540a-n.

Figure 6:
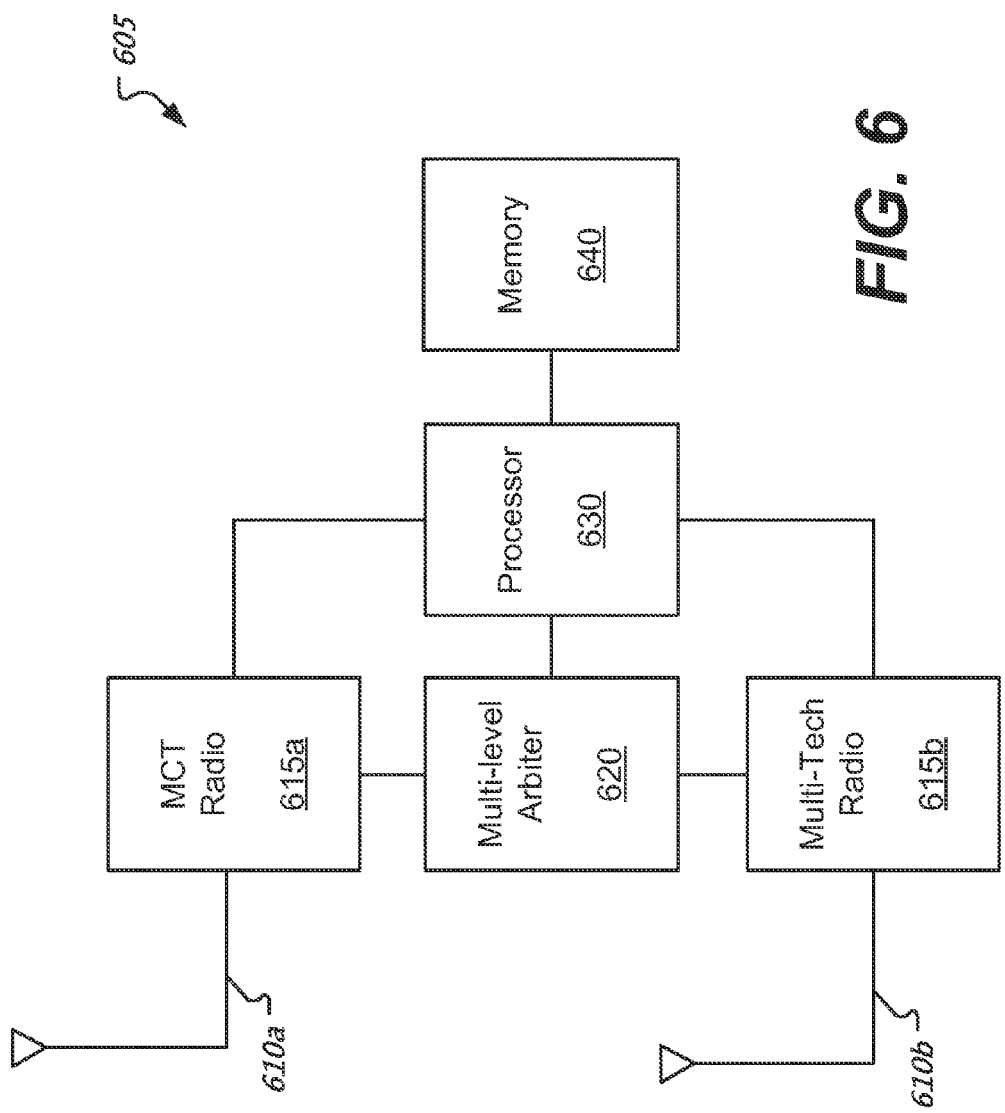
FIG. 6 shows a simplified architecture for an example of a wireless communication device including multiple radio resources.

FIG. 6 shows a simplified architecture for an example of a wireless communication device 605. The device 605 includes antennas 610a-b, radio resources 615a-b, a multi-level arbiter 620, processor 630, and memory 640. The processor 630 can include one or more processor cores. The device 605 can include one or more memories 640 configured to store information such as data, instructions, or both. The radio resources include a MCT radio 615a and a multi-technology radio 615b. The multi-technology radio 615b can be configured to support multiple wireless technologies. In some implementations, the MCT radio 615a is configured to transmit on licensed spectrum, whereas the multi-technology radio 615b is configured to transmit on unlicensed spectrum. The processor 630 can send multiple data streams to the radio resources 615a-b. The multi-level arbiter 620 can manage conflicts arising in simultaneous transmissions of the streams either within the same radio resource 615a-b or among radio resources 615a-b.

In some implementations, the radio resources 615a-b include a processor for baseband processing and a MAC controller. A MAC controller included in a radio resource can produce and send a request to the multi-level arbiter 620. In some implementations, the processor 630 is configured to be the MAC controller for one or more wireless technologies. In some implementations, the processor 630 configures the multi-level arbiter 620 with decision making rules to settle conflicts.

The radio resources 615a-b can include transmit and receive chain circuitry. Various examples of one or more processors that can be included in a radio resource 615a-b include a digital signal processor (DSP), a field-programmable gate array (FPGA), or a general-propose processor. In some implementations, a radio resource 615a-b includes integrated transmitting and receiving circuitry. In some implementations, a radio resource 615a-b includes dedicated circuitry for transmitting and dedicated circuitry for receiving.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other embodiments fall within the scope of the following claims.

What is claimed is:

1. A wireless communication device, comprising:
two or more radio resources configured to be collectively used by multiple different wireless radio technologies, wherein the multiple different wireless technologies include a first technology, a second technology, a third technology, and a fourth technology; and
an arbitrator configured to perform a multi-level arbitration among the first technology, the second technology, the third technology, and the fourth technology of the multiple different wireless radio technologies to produce an arbitration result,
wherein the multi-level arbitration comprises performing at least one arbitration based on a criterion comprising potential inter-technology frequency interference among a subset of the multiple different wireless radio technologies, wherein the multi-level arbitration comprises performing at least one arbitration based on a criterion comprising temperature of the device, a collective current draw of the two or more radio resources, or both,
wherein the multi-level arbitration comprises a first level arbitration to produce a first level result, a second level arbitration to produce a second level result when required by the first level result, and a third level arbitration to produce a third level result when required by the second level result, the arbitration result being based on (i) the first level result, (ii) the second level result, and (iii) the third level result, if any, and
wherein the two or more radio resources are operated in accordance with the arbitration result.

2. The device of claim 1, wherein the multi-level arbitration comprises:
performing the first level arbitration between (i) a request associated with the first technology and (ii) a request associated with the second technology to produce the first level result;
determining whether to perform the second level arbitration based on the first level result; and
selectively performing the second level arbitration to produce the second level result.

3. The device of claim 2, wherein the second level arbitration comprises:
performing an arbitration between (i) a request associated with the fourth technology and (ii) the request associated with the second technology; and
performing an arbitration between (i) the request associated with the fourth technology and (ii) a request associated with the third technology.

4. The device of claim 2, wherein the multi-level arbitration comprises:
determining whether to perform the third level arbitration based on the second level result; and
selectively performing the third level arbitration between (i) the request associated with the second technology and (ii) the request associated with the third technology to produce the third level result.

5. The device of claim 1, wherein the first technology, the second technology, and the third technology are respectively a Near Field Communication (NFC) technology, a wireless local area network (WLAN) technology, and a Bluetooth technology.

6. The device of claim 5, wherein the multi-level arbitration comprises:
performing the first level arbitration between (i) a request associated with the NFC technology and (ii) a request associated with the WLAN technology;
selectively performing the second level arbitration among (i) a request associated with the fourth technology, (ii) the request associated with the WLAN technology, and (iii) a request associated with the Bluetooth technology; and
selectively performing the third level arbitration between (i) the request associated with the WLAN technology and (ii) the request associated with the Bluetooth technology.

7. The device of claim 6, wherein the second level arbitration comprises:
performing an arbitration between (i) a request associated with the fourth technology and (ii) the request associated with the WLAN technology; and
performing an arbitration between (i) the request associated with the fourth technology and (ii) a request associated with the Bluetooth technology.

8. The device of claim 6, wherein the fourth technology is based on a version of Long-Term Evolution (LTE), High Speed Packet Access (HSPA), Wideband Code Division Multiple Access (WCDMA), CDMA2000, or Global System for Mobile Communications (GSM).

9. A method comprising:
performing, at a wireless communication device, an arbitration among multiple different wireless radio technologies, which collectively use two or more radio resources of the wireless communication device, to produce an arbitration result, wherein performing the arbitration comprises
performing a first level arbitration between (i) a request associated with a first technology of the multiple different wireless radio technologies and (ii) a request associated with a second technology of the multiple different wireless radio technologies to produce a first level result,
performing a second level arbitration to produce a second level result when indicated by the first level result, wherein performing the second level arbitration comprises performing an arbitration between (i) a request associated with a third technology of the multiple different wireless technologies and (ii) a request associated with a fourth technology of the multiple different wireless technologies, wherein performing the second level arbitration comprises performing an arbitration between (i) the request associated with the second technology and (ii) the request associated with the fourth technology,
determining whether to perform a third level arbitration based on the second level result, and
selectively performing the third level arbitration between (i) the request associated with the second technology and (ii) the request associated with the third technology to produce a third level result; and
operating the two or more radio resources in accordance with the arbitration result, the arbitration result being based on (i) the first level result, (ii) the second level result, and (iii) the third level result, if any.

10. The method of claim 9, wherein the first technology, the second technology, and the third technology are respectively a Near Field Communication (NFC) technology, a wireless local area network (WLAN) technology, and a Bluetooth technology.

11. The method of claim 10, wherein the fourth technology is based on a version of Long-Term Evolution (LTE), High Speed Packet Access (HSPA), Wideband Code Division Multiple Access (WCDMA), CDMA2000, or Global System for Mobile Communications (GSM).

12. The method of claim 9, wherein performing the first level arbitration comprises performing at least one arbitration to prevent or minimize an increase in temperature of the wireless communication device, a collective current draw of the two or more radio resources, or both.

13. The method of claim 9, wherein performing the second level arbitration comprises performing at least one arbitration to prevent or minimize potential inter-technology frequency interference among a subset of the multiple different wireless radio technologies.

14. A non-transitory computer readable storage medium embodying computer software, the computer software causing a wireless communication device to perform operations, the operations comprising:
performing an arbitration among multiple different wireless radio technologies, which collectively use two or more radio resources of the wireless communication device, to produce an arbitration result, wherein performing the arbitration comprises
performing a first level arbitration between (i) a request associated with a first technology of the multiple different wireless radio technologies and (ii) a request associated with a second technology of the multiple different wireless radio technologies to produce a first level result, and
performing a second level arbitration to produce a second level result when indicated by the first level result, wherein performing the second level arbitration comprises:
performing an arbitration between (i) a request associated with a third technology of the multiple different wireless technologies and (ii) a request associated with a fourth technology of the multiple different wireless technologies, wherein performing the second level arbitration comprises: performing an arbitration between (i) the request associated with the second technology and (ii) the request associated with the fourth technology,
determining whether to perform a third level arbitration based on the second level result, and
selectively performing the third level arbitration between (i) the request associated with the second technology and (ii) the request associated with the third technology to produce a third level result; and
operating the two or more radio resources in accordance with the arbitration result, the arbitration result being based on (i) the first level result, (ii) the second level result, and (iii) the third level result, if any.

15. The storage medium of claim 14, wherein the first technology, the second technology, and the third technology are respectively a Near Field Communication (NFC) technology, a wireless local area network (WLAN) technology, and a Bluetooth technology.

16. The storage medium of claim 14, wherein the fourth technology is based on a version of Long-Term Evolution (LTE), High Speed Packet Access (HSPA), Wideband Code Division Multiple Access (WCDMA), CDMA2000, or Global System for Mobile Communications (GSM).

* * * * *